(12) United States Patent
Chen

(10) Patent No.: US 9,329,450 B2
(45) Date of Patent: May 3, 2016

(54) DISPLAY DEVICE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 8 days.

(21) Appl. No.: 14/262,807

(22) Filed: Apr. 28, 2014

(65) Prior Publication Data

US 2014/0320945 A1    Oct. 30, 2014

(30) Foreign Application Priority Data

Apr. 29, 2013 (TW) .............................. 102115317 A

(51) Int. Cl.
| | |
|---|---|
| *G02F 1/153* | (2006.01) |
| *G02F 1/1347* | (2006.01) |
| *G02F 1/167* | (2006.01) |
| *G02F 1/139* | (2006.01) |
| *G02F 1/15* | (2006.01) |

(52) U.S. Cl.
CPC .............. *G02F 1/153* (2013.01); *G02F 1/1347* (2013.01); *G02F 1/1391* (2013.01); *G02F 1/15* (2013.01); *G02F 1/167* (2013.01); *G02F 2201/44* (2013.01)

(58) Field of Classification Search
CPC .......... G02F 1/1347; G02F 1/15; G02F 1/167
USPC ........ 359/265–275, 296; 345/105, 107; 349/1
See application file for complete search history.

(56) References Cited

U.S. PATENT DOCUMENTS

2010/0309541 A1* 12/2010 Lo et al. .......................... 359/292
2012/0154892 A1*  6/2012 Yashiro et al. ................. 359/270

\* cited by examiner

*Primary Examiner* — Tuyen Tra
(74) *Attorney, Agent, or Firm* — Novak Druce Connolly Bove + Quigg LLP

(57) ABSTRACT

A display device includes a first bitable display, a second display, and a bitable electrochromic member sandwiched between the first bitable display and the second display. The first bitable display is switchable between a transparent status and a displaying status. The electrochromic member is switchable between a transparent status and a color status under predetermined voltage, with a response time of the second display being less than 30 milliseconds.

10 Claims, 3 Drawing Sheets

DISPLAY DEVICE

BACKGROUND

1. Field

The present disclosure relates to displays, and particularly to a compound display device.

2. Background

Displays in many electronic devices may be a single type of a liquid crystal display (LCD) or an organic light emitting display (OLED).

BRIEF DESCRIPTION OF THE DRAWING

The components of the drawing are not necessarily drawn to scale, the emphasis instead being placed upon clearly illustrating the principles of the embodiments of the present disclosure.

DETAILED DESCRIPTION

Figure 1:
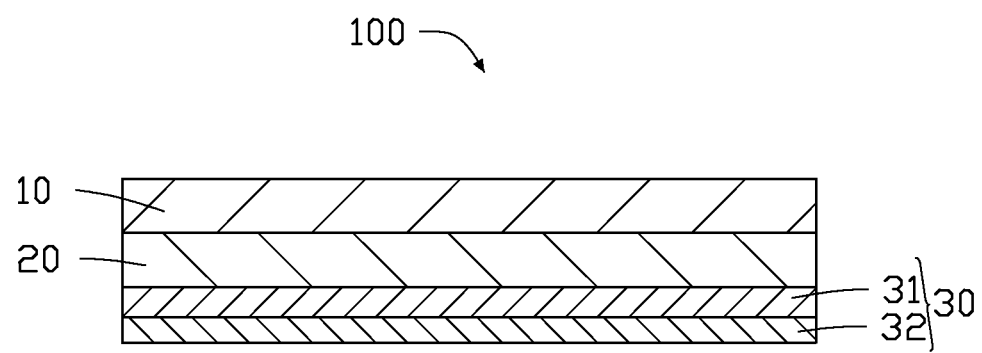
FIG. 1 is a schematic view of a display device, according to an exemplary embodiment of the present disclosure, the display device including a first display and an electrochromic member.

FIG. 1 illustrates one embodiment of a display device 100. The display device 100 includes a first display 10, an electrochromic member 20, and a second display 30.

The first display 10 is a bitable display. When a signal voltage is applied on the first display 10, the first display 10 displays a predetermined image, and when the signal voltage is dropped, the first display 10 keeps displaying the image until another signal voltage is applied. Further, the first display 10 can be switched between a transparent status and a displaying status under different predetermined driving voltages.

Figure 2:
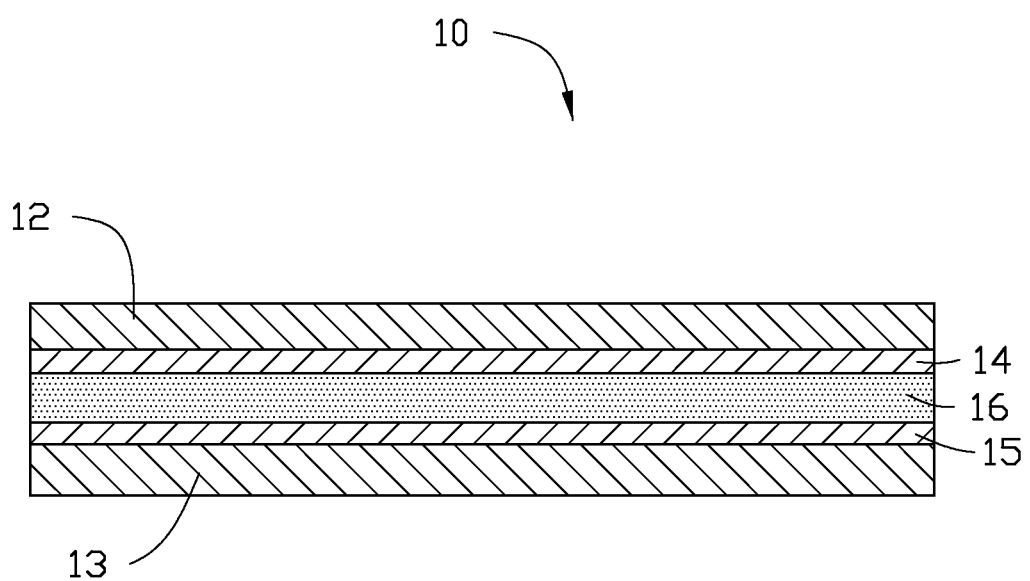
FIG. 2 is a schematic view of the first display of the display device of FIG. 1.

In this embodiment, the first display 10 can be an electrophoretic display. FIG. 2 illustrates that the first display 10 includes a first transparent substrate 12, a second transparent substrate 13, a first transparent electrode layer 14 formed on a surface of the first transparent substrate 12. In addition, a second transparent electrode layer 15 formed on a surface of the second transparent substrate 13, and an electrophoretic material layer 16 sandwiched between the first transparent electrode layer 14 and the second transparent electrode layer 15. The electrophoretic material layer 16 includes a base solution and a number of electrophoretic particles (not shown) suspended in the base solution. The first transparent electrode layer 14 and the second transparent electrode 15 receive a driving signal to drive the first display 10 to display predetermined images or keep the first display 10 at a transparent status.

The first display 10 can be other types of bitable displays, such as a bitable LCD.

Figure 3:
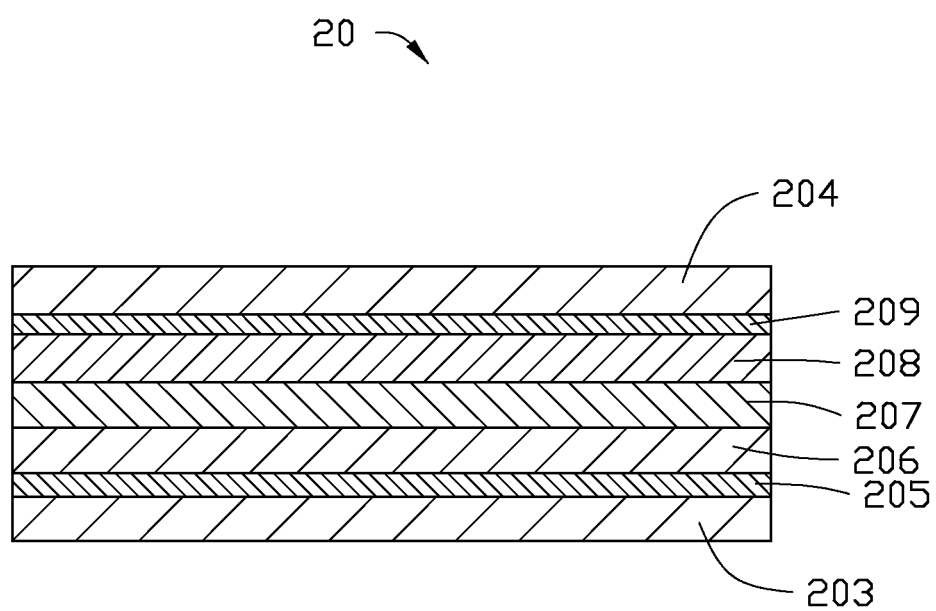
FIG. 3 is a schematic view of the electrochromic member of the display device of FIG. 1.

The electrochromic member 20 also has a bitable character. FIG. 3 illustrates that the electrochromic member 20 includes a third transparent substrate 203, a fourth transparent substrate 204, a third transparent electrode layer 205 formed on a surface of the third transparent substrate 203, a fourth transparent electrode layer 209 formed on a surface of the fourth transparent substrate 204, an electrochromic layer 206, an ionic conduction layer 207, and an ion storage layer 208. The ionic conduction layer 207 is sandwiched between the electrochromic layer 206 and the ion storage layer 208, the electrochromic layer 206 is attached to the third transparent electrode layer 207, and the ion storage layer 208 is attached to the fourth transparent electrode layer 209.

The third transparent substrate 203 and the fourth transparent substrate 204 can be glass substrates, sapphire substrates or flexible transparent substrate. In this embodiment, the third transparent substrate 203 is attached to the first display 10, and a surface of the third transparent substrate 203 is a smooth surface. The surface of the display 10 reflects light incident from the first display 10, making the first display display images. In other embodiments, the fourth transparent substrate 204 can be attached to the first display 10, and a surface of the fourth transparent substrate 204 is a smooth surface.

A material of the third transparent electrode layer 205 and the fourth transparent electrode layer 209 can be indium tin oxide (ITO). In this embodiment, the third transparent electrode layer 205 and the fourth transparent electrode layer 209 can be used as common electrodes.

The electrochromic layer 206 is made from an electrochromic material and can be controlled to switch between transparent status and a color displaying status via the third transparent electrode layer 205 and the fourth transparent electrode layer 209, such as tungsten trioxide ($WO_3$), molybdenum oxide ($MoO_3$), and iridium oxide (IrOx). In an oxidation state, the $WO_3$, the $MoO_3$ and the IrOx are transparent. In a redox state, the $WO_3$ and the $MoO_3$ are dark blue and the IrOx is black. Therefore, the electrochromic layer 206 can display predetermined color(s) or in a transparent status by applying different voltages between the third transparent electrode layer 205 and the fourth transparent electrode layer 209.

The ionic conduction layer 207 provides transmitting path of ions between the electrochromic layer 206 and the ion storage layer 208. The ionic conduction layer 207 can be made from a material of solid state electrolyte of high polymer.

The ion storage layer 208 stores ions to keep a balance of total charges in the electrochromic member 20.

FIG. 1 illustrates that the second display 30 has a high responding speed according to an input signal, thus the second display 30 is suitable to show dynamic images.

In this embodiment, a response time of the second display 30 is less than 30 milliseconds, and particularly, the response time of the second display 30 can be less than 16 milliseconds. In this embodiment, the second display 30 is an LCD. The second display 30 includes an LCD panel 31 and a backlight module 32. A surface of the LCD panel 31 is attached to the electrochromic member 20. The second display 30 can be other types of displays having a high responding speed, such as an OLED and a plasma display.

In use, the first display 10 and the electrochromic member 20 are applied to display static images, and the second display 30 is applied to display dynamic images. Because of the bitable character, the first display 10 and the electrochromic member 20 can keep displaying a static image without power supply. When dynamic images is needed to display, a control signal is applied to the first display 10 and the electrochromic member 20 to make the first display 10 and the electrochromic member 20 at a transparent status, and then the second display 30 is powered on to display dynamic images. During the displaying action of the second display 30, the first display 10 and the electrochromic member 20 are powered off. Therefore, electrical energy is saved when the display device displays static images.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. A display device, comprising:
   a first bitable display, the first bitable display being switchable between a transparent status and a displaying status;
   a second display, a response time of the second display being less than 30 milliseconds; and
   a bitable electrochromic member sandwiched between the first bitable display and the second display, the electrochromic member being switchable between a transparent status and a color status under predetermined voltage;
   wherein the electrochromic member comprises a first transparent electrode layer, a second transparent electrode layer, an electrochromic layer, an ionic conduction layer, and an ion storage layer, the ionic conduction layer is sandwiched between the electrochromic layer and the ion storage layer, the electrochromic layer is attached to the first transparent electrode layer, and the ion storage layer is attached to the second transparent electrode layer.

2. The display device of claim 1, wherein the first bitable display is an electrophoretic display.

3. The display device of claim 1, wherein the first display is a bitable liquid crystal display (LCD).

4. The display device of claim 1, wherein the second display is an LCD.

5. The display device of claim 4, wherein the second display comprises an LCD panel and a backlight module, a surface of the LCD panel is attached on the electrochromic member.

6. The display device of claim 1, wherein the second display is selected from a group consisting of an organic light emitting display and a plasma display.

7. The display device of claim 1, wherein the electrochromic member comprises a first transparent substrate and a second transparent substrate, the first transparent electrode layer is formed on a surface of the first transparent substrate, and the second transparent electrode layer is formed on a surface of the second transparent substrate.

8. The display device of claim 7, wherein the first transparent substrate is attached to the first display and the second transparent substrate is attached to the second display.

9. The display device of claim 7, wherein the first transparent substrate is attached to the second display and the second transparent substrate is attached to the first display.

10. The display device of claim 1, wherein the first transparent electrode layer and the second transparent electrode layer are common electrodes.

* * * * *